Sept. 15, 1959　　　M. R. HATFIELD　　　2,904,615
PRIMARY GALVANIC CELLS
Filed April 18, 1955

INVENTOR
MARCUS R. HATFIELD
BY
ATTORNEY

United States Patent Office 2,904,615
Patented Sept. 15, 1959

2,904,615

PRIMARY GALVANIC CELLS

Marcus R. Hatfield, Rocky River, Ohio, assignor to Union Carbide Corporation, a corporation of New York Application April 18, 1955, Serial No. 502,041

9 Claims. (Cl. 136—146)

This invention relates to primary galvanic cells, and more particularly to separators for such cells.

Conventionally, cells of this type comprise a consumable anode, an insoluble cathode, an electrolyte-wet depolarizing mix of carbon and manganese dioxide, and suitable means for separating the anode and depolarizer mix. Such separation is achieved and practiced in one of two ways, either by means of cereal paste or by means of separator media consisting of an electrolyte-soluble anode-contacting film supported by an electrolyte-insoluble paper material or barrier film.

Under certain conditions, the present barrier films used in production are deficient. Thus, regenerated cellulose separators present too complete a barrier under heavy discharge conditions. In general, clear films made by casting or regeneration are costly to prepare, and not readily usable in standard battery assembly machinery.

Prior art has shown that a barrier film suitable for use in dry cells must possess several important properties. It must be chemically inert to its cell surroundings. It must be bibulous and sufficiently permeable to permit the passage of the electrolyte ions. It must not, however, dissolve in the electrolyte, nor be so highly permeable as to permit the passage of large molecules of the contacting medium. It must take up but little of the cell volume. Its manufacturing cost must not add appreciably to the production costs of the cell. An ideal balance of the above-mentioned properties has long been sought in battery separators.

It is, therefore, the primary object of the invention to provide a novel dry cell separator construction embodying the foregoing desirable features, and which results in increased battery service output and flash current.

A further object of this invention is to provide a glassine-type barrier film of very thin dimensions such as will conserve cell space without consequent deleterious effects on cell life.

A separator material by means of which the objects of this invention are achieved is prepared by a method which comprises carrying out the process including slurrying convenient amounts of an aqueous suspension of alkali-soluble cellulose ethers in a pulp beater, pouring the resulting slurry over a foraminous support to form a sheet, drying the sheet thus formed, redampening the sheet and supercalendering it.

Figure 1:
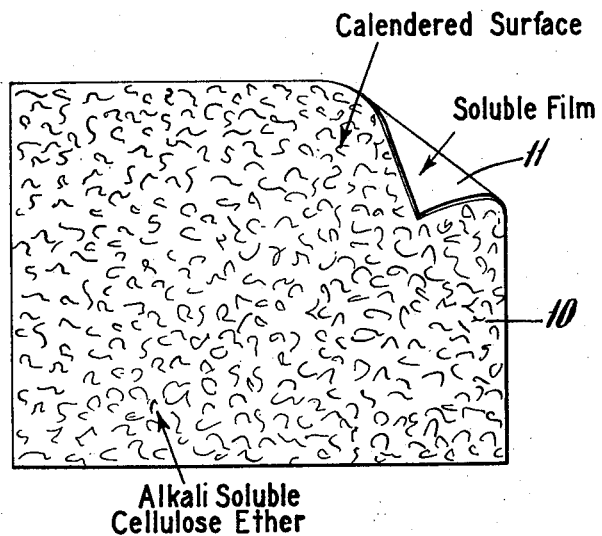
Figure 2:
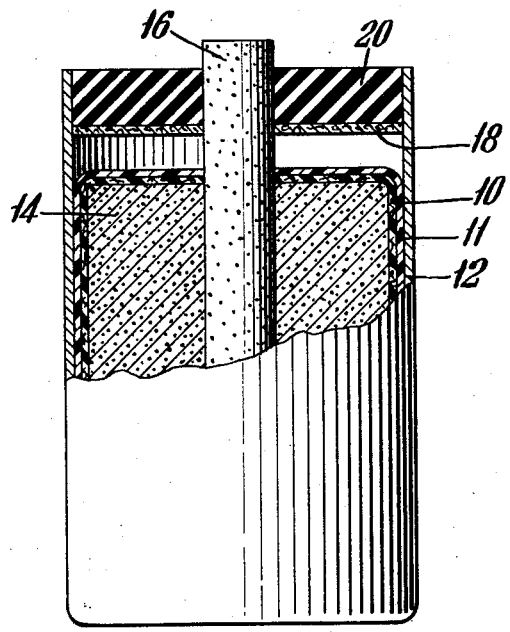

In the accompanying drawing:

Fig. 1 is a cross section in enlarged proportions of one possible composite dry cell separator embodying the invention; and Fig. 2 is an elevational view partially in section of a conventional dry cell provided with a separator of type shown in Fig. 1.

In its preferred embodiment the present invention contemplates suspending fibrous methyl cellulose having a methoxy content of 8 percent, based on the dry weight of the methyl cellulose, in water at a temperature not exceeding 90° C., the fiber concentration being up to 5 percent. This fibrous suspension is then subjected to the action of an ordinary paper maker's beater or of other apparatus capable of exerting a slurrying action on the fibers in water, such as, for example, a Jordan engine. Up to 4 percent by weight of the fiber (equal to 0.2 percent of the slurry concentration) of wet strength resins such as ureaformaldehyde and melamine formaldehyde may be added to the fibers during beating to reduce the amount of soluble material in the paper, thereby enhancing its barrier qualities, and to provide sufficient wet strength for the calendering process. The resulting fibrous slurry is then passed to a suitable paper machine of the foraminous support type such as, for example, a Fourdrinier machine, where it is shaped into a sheet of the required thickness. This sheet is very wet as it issues from the press roll of the machine, and must be dried by passing it over a drying cylinder. After redampening, the paper is supercalendered to knit the fibers together, and to provide an essentially continuous water-insoluble film. During this process, room temperature or the lower temperatures of ingoing stock are preferred. By dampening and supercalendering the sheets, the fibers are compressed sufficiently to knit them together.

Separator sheets cut from the material produced in the manner described retain great mechanical strength, even when wet, and do not tear during conventional cell assembly procedures, despite the space-conserving thickness. Ions in solution readily diffuse through this barrier material in a manner which is more uniform than that occurring in presently employed separators. Prior to use, a contacting soluble film must be applied next to the anode. An anode film suitable for this purpose is described in U.S. Patent 2,534,336 issued to N. C. Cahoon.

The raw materials found suitable in the manufacture of the separators of the present invention are alkali soluble cellulose ethers, which are more bibulous than straight cellulosic fibers, but of course not soluble enough to dissolve or disintegrate in the course of preparation. Substituted cellulosic fibers such as ethyl cellulose, hydroxy ethyl cellulose and similar compounds are suitable, providing the substitution is so limited that the product is soluble only in alkaline solutions, but not in water. In the case of methyl cellulose, for example, the methoxy content after substitution should be from 5 percent to 18 percent, based on the dry weight of the methyl cellulose, 8 percent to 12 percent being a suitable range for most applications.

Optionally, it may be desirable to add as much as 50 percent of purified cellulose fibers such as kraft pulp fibers, alpha cellulose pulp, rag fiber and spun glass staple fibers to obtain increased strength.

A variety of cell types including round cells, batteries of flat cells and external cathode cells have been constructed using the material of this invention as a barrier and a soluble-contacting film.

Thus there is shown in Fig. 2 a conventional cell provided with a composite dry cell separator 10 of the type indicated in Fig. 1 as embodying the invention, and to which had been applied a soluble anode film 11. The separator is interposed between the zinc electrode 12 and the electrolyte-wet depolarizing mix 14 in which a carbon electrode 16 is positioned. Suitable sealing means, such as a washer 18 and a sealing compound 20, such as pitch, are provided as usual at the top of the cell. The cell separator may be of any desired thickness as the material of the invention possesses great physical strength even when in extremely thin sections of about 0.02 mm. A satisfactory dimension range is one in general between 0.02 mm. and 0.12 mm.

It was observed that flash current or that maximum current observed on a dead beat ammeter which a battery can deliver through 0.01 ohm increased by 10 percent over that of conventionally assembled cells. Their efficient service life, both on intermittent service as well as on a shelf basis, was found to be increased by as much as 30 percent in the case of heavy drains over conventionally separated cell units.

What is claimed is:

1. A fibrous, supercalendered barrier film consisting of bibulous alkali soluble, water insoluble cellulose ethers.

2. A fibrous, supercalendered barrier film consisting of a bibulous alkali soluble, water insoluble cellulose ether, about 2 percent by weight thereof of a wet strength resin and up to 50 percent by weight of said ether of a purified cellulose fiber.

3. A fibrous, supercalendered, glassine-type barrier film consisting of bibulous, alkali soluble, water insoluble methyl cellulose ether having about 5 percent to about 18 percent methoxy content, based on the dry weight of said methyl cellulose ether.

4. A fibrous, supercalendered, glassine-type barrier film comprising bibulous alkali-soluble, water-insoluble, methyl cellulose ether having about 5 percent to about 18 percent methoxy content based on the dry weight of said methyl cellulose ether, up to 2 percent by weight thereof of a wet strength resin selected from the group consisting of melamine formaldehyde and ureaformaldehyde, and up to 50 percent by weight thereof of at least one purified cellulose fiber selected from the group which consists of kraft pulp fibers, alpha cellulose sulfite fibers, alpha cellulose pulp and spun glass staple fibers.

5. In a primary galvanic cell comprising a consumable anode, an insoluble cathode, a depolarizing mix, an electrolyte, an electrolyte-soluble film in contact with said anode, a fibrous supercalendered barrier film intermediate said soluble film and said depolarizing mix, comprising bibulous alkali-soluble, water-insoluble cellulose ethers.

6. In a primary galvanic cell comprising a consumable anode, an insoluble cathode, a deplorazing mix, an electrolyte, an electrolyte-soluble film in contact with said anode, a fibrous supercalendered barrier film intermediate said soluble film and said depolarizing mix, comprising bibulous alkali-soluble, water-insoluble cellulose ethers, and about 2 percent by weight thereof of a wet strength resin, and up to 50 percent, by weight, based on the amount of said ethers, of a purified cellulose fiber.

7. In a primary galvanic cell comprising a consumable anode, an insoluble cathode, a depolarizing mix, an electrolyte, an electrolyte-soluble film in contact with said anode, a fibrous supercalendered barrier film intermediate said soluble film and said depolarizing mix, comprising methyl cellulose methoxylated in the range of 5 percent to 18 percent by weight thereof.

8. In a primary galvanic cell comprising a consumable anode, an insoluble cathode, a depolarizing mix, an electrolyte, an electrolyte-soluble film in contact with said anode, a fibrous supercalendered barrier film intermediate said soluble film and said depolarizing mix, comprising methyl cellulose methoxylated in the range of 8 percent to 12 percent by weight thereof.

9. In a primary galvanic cell comprising a consumable anode, an insoluble cathode, a depolarizing mix, an electrolyte, an electrolyte-soluble film in contact with said anode, a fibrous supercalendered barrier film intermediate said soluble film and said depolarizing mix, comprising methyl cellulose methoxylated in the range of 5 percent to 18 percent by weight thereof, up to 2 percent by weight of said methyl cellulose of a wet strength resin, and up to 50 percent by weight of said methyl cellulose of a purified cellulose fiber.

References Cited in the file of this patent

UNITED STATES PATENTS

| | | |
|---|---|---|
| 2,124,330 | Pascoe et al. | July 19, 1938 |
| 2,184,307 | Larson | Dec. 26, 1939 |
| 2,292,118 | Guhl | Aug. 4, 1942 |
| 2,423,428 | Pollard | July 1, 1947 |
| 2,534,336 | Cahoon | Dec. 19, 1950 |
| 2,551,799 | Hatfield | May 8, 1951 |
| 2,662,107 | Uhlig et al. | Dec. 8, 1953 |